United States Patent [19]
Rice et al.

[11] Patent Number: 5,056,323
[45] Date of Patent: Oct. 15, 1991

[54] HYDROCARBON REFRIGERATION SYSTEM AND METHOD

[75] Inventors: Warren Rice, Tempe, Ariz.; Craig Hosterman, Corvallis, Oreg.; George C. Beakley, Jr., Tempe, Ariz.

[73] Assignee: Natural Energy Systems, Tempe, Ariz.

[21] Appl. No.: 543,976

[22] Filed: Jun. 26, 1990

[51] Int. Cl.⁵ ............................................. F25B 1/00
[52] U.S. Cl. ...................................... 62/114; 62/115; 62/500
[58] Field of Search ............... 62/114, 115, 116, 119, 62/122, 260, 498, 500

[56] References Cited

U.S. PATENT DOCUMENTS

| | | | |
|---|---|---|---|
| 1,781,051 | 11/1930 | Carrier | 62/114 |
| 1,882,256 | 10/1932 | Randel | 62/500 X |
| 2,152,663 | 4/1939 | Randel | 62/500 |
| 2,191,864 | 2/1940 | Schaefer | 62/119 |
| 2,751,762 | 6/1956 | Colton | 62/114 X |
| 3,789,617 | 2/1974 | Rannow | 62/115 |
| 3,848,424 | 11/1974 | Rhea | 62/115 |
| 4,078,392 | 3/1978 | Kestner | 62/114 |
| 4,157,015 | 6/1979 | Hosterman et al. | 62/115 |
| 4,251,998 | 2/1981 | Hosterman et al. | 62/115 |
| 4,424,681 | 1/1984 | Rice et al. | 62/114 |

Primary Examiner—Lloyd L. King
Attorney, Agent, or Firm—Cahill, Sutton & Thomas

[57] ABSTRACT

A hydrocarbon fluid serves as the refrigerant fluid in combination with a non-miscible carrier fluid in a hydraulic refrigeration system.

30 Claims, 1 Drawing Sheet

HYDROCARBON REFRIGERATION SYSTEM AND METHOD

CROSS REFERENCE TO RELATED PATENTS

This application is related to inventions described in U.S. Pat. No. 4,157,015 entitled "HYDRAULIC REFRIGERATION SYSTEM AND METHOD", U.S. Pat. No. 4,311,025 entitled "GAS COMPRESSION SYSTEM", U.S. Pat. No. 4,251,998 entitled "HYDRAULIC REFRIGERATION SYSTEM AND METHOD" and U.S. Pat. No. 4,424,681 entitled "HYDRAULIC REFRIGERATION SYSTEM AND METHOD", all of which patents are assigned to the present assignee.

BACKGROUND OF THE INVENTION

1. Field of the Invention

The present invention relates to refrigeration systems and, more particularly, to hydraulic refrigeration systems employing a hydrocarbon as a refrigerant.

2. Description of the Prior Art

The principle of entrapping and compressing air by movement of water, i.e., using a hydraulic air compressor or "trompe" has been employed industrially in the United States for some years. In one such installation, air is drawn into a down flowing stream of water and trapped within a cavernous underground chamber where the head of water maintains it under compression. The air may be permitted to escape through a pneumatic engine or turbine; thus, power may be generated.

In refrigeration systems, the major operating costs arise from the costs attendant energizing a mechanical compressor to compress adiabatically the refrigerant. Additionally, the cost of such a compressor is a substantial part of the initial cost of the refrigeration system itself. Thus, it would be beneficial from the standpoint of both initial and operating costs to eliminate the need for a mechanical compressor in a refrigeration system.

The use of CFC refrigerants, sometimes referred to by the trademark "FREON", is in the process of being legislated and taxed out of existence. These compounds, when leaked or dumped to the atmosphere, are thought to migrate to the stratosphere where destruction of the ozone layer is believed to occur. This layer is the earth's protection against the part of the radiation from the sun known as UV-B. An increase in UV-B radiation reaching the surface of the earth will cause increased incidence of skin and other cancer in humans and, if severe enough, interference with plant life and interruption of the earth's food chain.

An alternative family of compounds known as HCFC's are thought to cause much less ozone damage than do the CFC compounds but this is not certain; legislation is already underway against use of HCFC compounds. Nevertheless, the refrigeration industry is presently proceeding with new designs and manufacturing methods to produce refrigeration systems using HCFC compounds. This direction would appear to be an interim solution and not a permanent or desirable solution to the well recognized problem. Furthermore, conventional refrigeration systems using HCFC compounds are larger and less efficient than systems in current use with CFC compounds.

An additional alternative family of compounds known as HFC's are thought to do little or no damage to the ozone layer. The use of these compounds is still in the preliminary stages of experimentation and production. If these compounds prove feasible, they will require new system designs and manufacturing techniques. It is anticipated that these systems will be expensive and inefficient. Other conventional systems of refrigeration include absorption systems and systems using anhydrous ammonia as the refrigerant. For various reasons, these systems also are not suitable replacements for conventional systems using CFC compounds.

The family of liquid hydrocarbons are known to be excellent refrigerants except that they are flammable. It is not safe or feasible to use hydrocarbon refrigerants in conventional vapor compression refrigeration machines. Any leak would expel a pure flammable liquid. In the piping or conduits following the compressor, the refrigerant is at a temperature of several hundred degrees Fahrenheit and ignition of any leaking refrigerant would probably occur immediately upon leakage. Because of the relatively high pressures, intense vibration and pressure oscillations attendant conventional systems, some leakage within the system is almost guaranteed.

SUMMARY OF THE INVENTION

The present invention is directed to a refrigeration system which employs the principles of operation of a trompe system for effecting isothermal compression of a hydrocarbon refrigerant to a liquid state. To provide the requisite pressure head to the liquid carrier to effect compression of the refrigerant fluid, a pump for pumping the liquid carrier through a closed loop is employed. After separation of the liquid refrigerant from the liquid carrier, the refrigerant fluid is pumped to an evaporator through an expansion valve. The liquid carrier is pumped upwardly through a cross flow heat exchanger. A variable volume tank is coupled to the upflowing liquid carrier to permit an increase or decrease in volume of the liquid carrier. The outflow of the gaseous refrigerant from the evaporator flows through a regenerator coupled with the refrigerant conduit leading to the expansion valve and to an entraining unit. The gaseous refrigerant is entrained within the down flowing liquid carrier to repeat the cycle. The highest temperature in the system is only in the range of 85° to 110° F. which is well below the ignition point of the hydrocarbon refrigerant. The large piping employed during compression results in a 100/1 mixing with the liquid carrier, which mixture is not flammable. The flow of refrigerant from the separator to the entraining unit is through a relatively small diameter pipe or conduit, which size of pipe is easy to make virtually leak proof. Moreover, the pressures within the pipe are low to moderate and a safety hazard is not presented.

It is therefore a primary object of the present invention to provide a refrigeration system for using a hydrocarbon refrigerant.

Another object of the present invention is to provide a hydraulic refrigeration system having a hydrocarbon refrigerant.

Yet another object of the present invention is to provide a refrigerant for use in a refrigeration system which will not cause damage to the ozone layer in the event of leakage and escape of refrigerant.

Still another object of the present invention is to provide a refrigeration system which will permit control of parameters necessary to optimize operation during varying load conditions.

A further object of the present invention is to provide a refrigeration system safe for use with a hydrocarbon as the refrigerant.

A yet further object of the present invention is to provide a method for using a hydrocarbon in a refrigeration system.

A still further object of the present invention is to provide a method for providing refrigeration without use of ozone layer damaging refrigerants.

These and other objects of the present invention will become apparent to those skilled in the art as the description thereof proceeds.

BRIEF DESCRIPTION OF THE DRAWINGS

The present invention will be described with greater clarity and specificity with reference to the following drawing, in which.

DESCRIPTION OF THE PREFERRED EMBODIMENT

Figure 1:
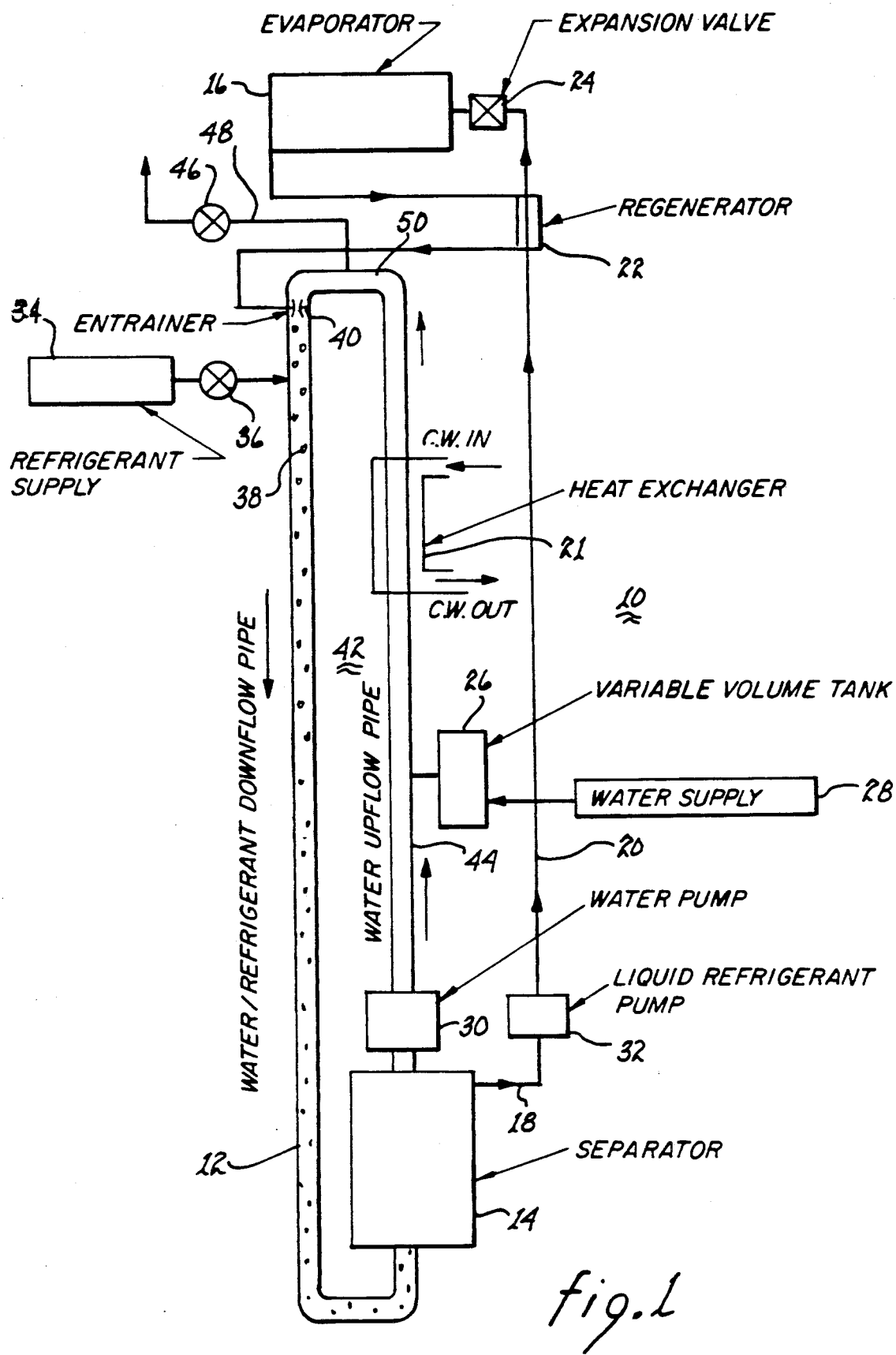
FIG. 1 illustrates a block diagram of the components for the hydrocarbon refrigeration system.

Conventional refrigeration systems involve temperatures of several hundred degrees Fahrenheit, well above the ignition temperature of gaseous hydrocarbons. Any leaking hydrocarbon at this temperature would probably ignite immediately. Conventional refrigeration systems are prone to some leakage because the condenser operates at relatively high pressures. Moreover, the intense vibration and pressure oscillations experienced by components in conventional refrigeration systems contribute to or may induce leakage. Because of the safety hazard potential resulting from an expectation of ignition of a hydrocarbon refrigerant upon leakage, such a hydrocarbon refrigerant cannot be used with a conventional refrigeration system.

A hydraulic refrigeration system 10, as illustrated in FIG. 1, can use a hydrocarbon refrigerant with essentially complete safety. The highest temperature in the hydraulic refrigeration system is only in the range of 85°-110° F, which temperature range is far below the ignition point of a hydrocarbon refrigerant. In all of the large piping, down flow pipe 12, of the hydraulic refrigeration system, the refrigerant is mixed with more than 100 times its own weight of the carrier fluid, such as water. Thus, any leaked refrigerant would not be flammable. Between separator 14 and evaporator 16 and from the evaporator to the entrainment means, the hydrocarbon refrigerant is not mixed with water. However, pipes 18 and 20 used in this section are of relatively small diameter and easy to make virtually leak proof. Furthermore, evaporator 16 is a passive component and unlikely to leak at its normal low to moderate pressure. From a practical standpoint, a hydrocarbon refrigerant in a hydraulic refrigeration system would appear not to pose a safety hazard.

Among the available hydrocarbon refrigerants, n-butane, isobutane and propane appear to be the most likely and practical refrigerants; they are not miscible with a carrier fluid, such as water. For air conditioning purposes, n-butane is thought to be the best choice. At the evaporator temperatures of interest in an air conditioning systems, the pressure is only slightly greater than atmospheric pressure. N-butane has a large latent heat of condensation and has a reasonably large density when in the vapor states. These are desirable properties for a refrigerant. However, isobutane and propane, and possibly other hydrocarbons, may be preferred in particular refrigeration and air conditioning applications of a hydraulic refrigeration system.

A hydraulic refrigeration system can be used as a heat pump in the same general manner as can any vapor compression refrigeration system. In such system, the evaporator temperature is made less than that of an available environmental heat source to transfer heat from the heat source to the refrigerant as the refrigerant passes through the evaporator. Ultimately, the heat is manifested as thermal energy in the hydraulic refrigeration system circulating water. The water, or carrier, is maintained at a temperature greater than that of the fluid or object to be heated and heat is continuously removed from the hydraulic refrigeration system by such fluid or object through heat exchanger 21. Just as in the case with a conventional vapor compression heat pump, the hydraulic refrigeration system supplies as heat both the energy entering the refrigerant at the evaporator and the energy supplied to the water (carrier) and refrigerant by the pumps. Therefore, the "energy efficiency ratio" (EER) is larger when the hydraulic refrigeration system is used as a heat pump than it is when the hydraulic refrigeration system is used as a refrigerator.

A regenerator 22 can be added to the basic hydraulic refrigeration system and will result in an increase in the EER; that is, the system becomes more energy conservative. The regenerator is a refrigerant to refrigerant heat exchanger. The liquid refrigerant flowing toward expansion valve 24, at a nominal temperature of 100° F, exchanges heat in counterflow with the vaporous refrigerant leaving the evaporator at a nominal temperature of 50° F. As a result, the liquid refrigerant is cooled and the vapor is heated with attendant thermodynamic benefits to the efficiency of the system. The most obvious location for evaporator 16 is at or near the top of hydraulic refrigeration system 10 but it can be located anywhere, including the bottom of the system. This feature of a remote evaporator is easily achievable by using a hydraulic refrigeration system and which feature is difficult to achieve with conventional refrigeration systems. For example, it can be at the air register in a building, which location would allow reduction in the amount of large air ducting common in conventional air conditioning systems. Alternatively, several small evaporators may be used, instead of a single larger one, at remote and different locations. This is feasible because there is no strict requirement for the refrigerant return to the compressor conduit at a certain thermodynamic or physical state. It is well known that a conventional compressor cannot tolerate any liquid refrigerant and the performance of a conventional system is compromised by excessive superheating. Thus, the refrigerant could contain some liquid or be highly superheated without resulting in problems of operation.

In air conditioning applications particularly, the refrigeration load varies continuously both daily and seasonally. For most efficient energy utilization, a refrigeration system should employ a modulating control system to permit the system to run all the time during the season and slowly change one or more of the operating parameters to maintain the system near its maximum possible efficiency under all refrigeration loads. These parameters may include compressor speed, fan speeds, etc. While such modulation is featured in some conventional systems, it is difficult, complicated and expensive to accomplish primarily because conventional systems use only a single fluid and have a fixed volume in which it is contained. Thus, most presently used conventional systems are either on or off and achieve only an average matching of refrigeration to meet varying refrigeration loads. This results in conventional systems operating most of the time at an "off-design point" condition which is a part load or overload condition with a substantial reduction in efficiency from that possible by using a modulating control.

The present hydraulic refrigeration system can achieve load matching modulation easily and simply with substantial flexibility. This is possible because there are two fluids, the carrier fluid and the refrigerant fluid. Each of these can be separate controlled with regard to flow rates, temperatures, etc. Provision can easily be made to vary the total volume of the pipes, conduits and tanks in which the fluids are contained. With respect to the carrier fluid, the addition of a variable volume tank 26 permits accepting the carrier fluid (water) from the main conduit pipe 12 of the hydraulic refrigeration system or from a water supply 28.

The temperature in evaporator 16 can be held at a desired value. To increase the evaporator temperature, water can be added from variable volume tank 26 which would result in an increase in pressure in the evaporator, as well as throughout hydraulic refrigeration system 10 since the refrigerant in the evaporator is a two phase mixture. By removing water from the hydraulic refrigeration system to the variable volume tank, the evaporator pressure and temperature will be reduced. An automatic control loop could be employed to vary the volume of the water in the variable volume tank in response to a control error signal from a temperature sensor in the evaporator.

A change in refrigeration load could be compensated by the variable volume tank as described above. In order to operate at a new load with good efficiency, the water flow rate and/or the refrigerant flow rate should be set to new values to yield the best energy efficiency at the new load. Using n-butane as the refrigerant, performance curves based upon flow rates can be readily determined by analytical modeling techniques. Accordingly, flow rate sensors and refrigeration rate sensors could be used to provide input information to a control system element, which element would contain an algorithm for the approximate performance characteristics of the hydraulic refrigeration system. The control system element would also provide an output to cause or result in adjustment of the speed of water pump 30 and liquid refrigerant pump 32 to maintain operation near the possible maximum efficiency.

Based upon theoretical deduction and proven by direct experimentation, the fluids in a hydraulic refrigeration system must be very well deaerated. If not, the necessary condensation of the refrigerant will not occur in a satisfactory manner. While any of the several well known means of deaeration could be used, the following method is preferred because it is easily, quickly and cheaply performed. The hydraulic refrigeration system is initially filled with distilled water with variable volume tank 26 being at its smallest volume. The water is caused to circulate slowly by water pump 30. Refrigerant from a refrigerant supply 34 is continuously injected into the refrigerant loop through a fill valve 36. Upon injection, it forms bubbles in the water in addition to the bubbles 38 formed upon entrainment of the refrigerant through entrainer 40. The air that is in solution in the water diffuses into bubbles 38 of the refrigerant as they repeatedly travel around water loop 42, down pipe 12 and up pipe 44. The refrigerant is allowed to escape from the hydraulic refrigeration system to the atmosphere from a valve 46 connected by a conduit 48 at the highest location on water loop 42, such as introducing pipe 50 for introducing the upflowing water to the downflowing water. The escape rate is at approximately the same flow rate as that of the refrigerant being supplied. This process is continued for several hours until the fluids in the system are sufficiently deaerated. Refrigerant escape valve 46 is closed and additional refrigerant is added to the desired charging amount. This may be referred to as a purging method of deaeration.

Various types of separators 14 may be used in a hydraulic refrigeration system. Preferably, the separator should be physically small and cause only a small pressure drop in the fluid. It should be passive (without rotating shafts) and achieve excellent separation of the liquid refrigerant from the carrier liquid. These characteristics are mutually exclusive and the choice of the separator and its design details will necessarily result in certain compromises. A conventional but specially designed separator would be a reasonable choice. A separator of this type has been analytically modeled. It will gravitationally separate by using myriad fixed circular disks within a circular housing. Laminar flow of the mixture radially between the disks allow the droplets of refrigerant to separate from the carrier liquid and form a film on the disks. The film is collected as a liquid refrigerant stream leaving the separator. Calculations indicate excellent separation with very small pressure drop; however, such type of separator would be relatively large.

Hydraulic refrigeration system 10 may be used to provide refrigeration below the freezing temperature of water, the carrier, by achieving good separation and/or using an antifreeze fluid in the water. Alternatively, evaporator 16 may include a flexible structure to permit minor amounts of ice that may be formed on the surface to be flexed off and removed. If a desired product is ice for cooling or storing, rather than for consumption in food or drink, "frazzle ice" can be formed by operating the evaporator at a temperature lower than the freezing temperature of the water and deliberately spraying water in the evaporator. The resulting ice would be much like snow or sleet and would be contaminated by the hydrocarbon refrigerant. However, there may be a wide commercial use of such an icemaking machine. The refrigerant and the water could be recovered after use and reinjected into the hydraulic refrigeration system.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. Apparatus for compressing and withdrawing heat from a hydrocarbon refrigerant fluid in a refrigeration system, which refrigeration system includes an expansion valve and an evaporator, said apparatus comprising in combination:

a) a down pipe for conveying the hydrocarbon refrigerant fluid downwardly;

b) a fluid non-miscible with the hydrocarbon refrigerant fluid;
c) means for introducing the non-miscible fluid into said down pipe and urge downward flow therethrough;
d) means for conveying the hydrocarbon refrigerant fluid from the evaporator to said down pipe;
e) means for entraining the hydrocarbon refrigerant fluid within the non-miscible fluid flowing downwardly through said down pipe to convey the hydrocarbon refrigerant fluid downwardly and compress the hydrocarbon refrigerant fluid by the head of the non-miscible fluid into a liquid state;
f) a separation chamber disposed at the lower end of said down pipe for receiving and segregating the hydrocarbon refrigerant fluid and the non-miscible fluid;
g) pipe means for withdrawing the hydrocarbon refrigerant fluid from said separation chamber and conveying it to the expansion valve;
h) pump means for maintaining the hydrocarbon refrigerant fluid in a liquid state within said pipe means between said separation chamber and the expansion valve; and
i) further pipe means for withdrawing the non-miscible fluid from said separation chamber.

2. The apparatus as set forth in claim 1 including a variable volume tank connected in fluid communication with said further pipe means.

3. The apparatus as set forth in claim 1 wherein said further pipe means including an up pipe for conveying the non-miscible fluid from said separation chamber to said introducing means and a pump for pumping the non-miscible fluid through said up pipe.

4. The apparatus as set forth in claim 3 including a variable volume tank connected in fluid communication with said up pipe.

5. Apparatus for converting a gaseous hydrocarbon fluid expelled from an evaporator in a refrigeration system into a liquid hydrocarbon fluid introduced to an expansion valve of the refrigeration system by entraining the hydrocarbon fluid with a carrier non-miscible with hydrocarbon fluid, said apparatus comprising in combination:
a) means for entraining the gaseous hydrocarbon fluid with the carrier;
b) a down pipe for conveying the carrier and the entrained hydrocarbon fluid downwardly and increasing the pressure thereof in proportion to the depth of said down pipe until the entrained gaseous hydrocarbon fluid is converted into entrained liquid hydrocarbon fluid;
c) a separation chamber disposed at the lower end of said down pipe for receiving and segregating the downwardly flowing carrier and entrained hydrocarbon fluid;
d) means for withdrawing the carrier from said separation chamber; and
e) means for conveying the hydrocarbon fluid from said separation chamber to the expansion valve and to the evaporator.

6. The apparatus as set forth in claim 5 including further means for conveying the hydrocarbon fluid from said separation chamber to the expansion valve.

7. The apparatus as set forth in claim 6 wherein said further conveying means comprises a pump.

8. The apparatus as set forth in claim 5 including an up pipe for conveying the carrier from said separation chamber to said down pipe to form a carrier loop and a variable volume tank in fluid communication with said up pipe for accommodating variations in volume of the carrier within the loop.

9. The apparatus as set forth in claim 8 wherein said withdrawing means includes pump means for transporting the carrier through said up pipe to said entraining means.

10. A method for compressing and withdrawing heat from a hydrocarbon fluid within a refrigeration system having an evaporator and an expansion valve, said method comprising the steps of:
a) establishing downward flow of a fluid non-miscible with the hydrocarbon fluid within a down pipe;
b) conveying the hydrocarbon fluid in a gaseous state from the evaporator to the upper end of the down pipe;
c) entraining the hydrocarbon fluid within the downward flow of the non-miscible fluid to convert the hydrocarbon fluid to a liquid state;
d) separating the hydrocarbon fluid from the non-miscible fluid at the lower end of the down pipe; and
e) transmitting the separated hydrocarbon fluid from the lower end of the down pipe through the expansion valve and to the evaporator.

11. The method as set forth in claim 10 including the step of drawing and pumping the non-miscible fluid from the lower end of the down pipe to the upper end of the down pipe.

12. The method as set forth in claim 11 including the step of varying the volume of the non-miscible fluid.

13. A method for converting a gaseous hydrocarbon fluid expelled from an evaporator in a refrigeration system into a mostly liquid hydrocarbon fluid introduced to an expansion valve of the refrigeration system by entraining the hydrocarbon fluid with a carrier non-miscible with the hydrocarbon fluid, said method comprising the steps of:
a) entraining the gaseous hydrocarbon fluid with the carrier;
b) conveying the carrier and the entrained hydrocarbon fluid downwardly through a down pipe to increase the pressure thereof in proportion to the depth of the down pipe until the entrained gaseous hydrocarbon fluid is converted into entrained mostly liquid hydrocarbon fluid;
c) segregating the carrier from the liquid hydrocarbon fluid;
d) withdrawing the segregated carrier and returning the carrier to the down pipe; and
e) conveying the segregated mostly liquid hydrocarbon fluid to the expansion valve.

14. The method as set forth in claim 13 including the step of pumping the mostly liquid hydrocarbon fluid under pressure to the expansion valve.

15. The method as set forth in claim 14 including the step of accommodating for differences in load placed upon the refrigeration system by varying the volume of the carrier.

16. A hydraulic refrigeration apparatus including an expansion valve and an evaporator, said apparatus comprising in combination;
a) a refrigerant fluid comprising a hydrocarbon fluid;
b) a down pipe for conveying said hydrocarbon fluid downwardly;
c) a fluid non-miscible with said hydrocarbon fluid;

d) means for introducing the non-miscible fluid into said down pipe and urge downward flow therethrough;

e) means for entraining said hydrocarbon fluid within the non-miscible fluid flowing downwardly through said down pipe to convey said hydrocarbon fluid downwardly and compress said hydrocarbon fluid by the head of the non-miscible fluid;

f) means disposed at the lower end of said down pipe for receiving and segregating said hydrocarbon fluid and the non-miscible fluid;

g) means for withdrawing said hydrocarbon fluid from said receiving and segregating means and conveying it to the expansion valve;

h) means for conveying said hydrocarbon fluid from the evaporator to said entraining means; and i) further means for withdrawing the non-miscible fluid from said receiving and segregating means and means for returning the non-miscible fluid to said down pipe.

17. The apparatus as set forth in claim 16 wherein said entraining means includes an outlet disposed within and subjected to the flow forces attendant the flowing non-miscible fluid within said down pipe.

18. The apparatus as set forth in claim 16 wherein said further withdrawing means includes a pump for pumping the non-miscible fluid from said separation chamber through said returning means to said introducing means.

19. The apparatus as set forth in claim 16 wherein the non-miscible fluid comprises water.

20. In a hydraulic refrigeration system having an expansion valve, an evaporator, a refrigerant fluid and a fluid non-miscible with the refrigerant fluid, the improvement comprising in combination:

a) a hydrocarbon fluid as the refrigerant fluid;

b) a down pipe for conveying said hydrocarbon fluid and the non-miscible fluid downwardly and increasing the pressure thereof at any point in proportion to the depth of the point within said down pipe;

c) a conduit disposed at the upper end of said down pipe for introducing the non-miscible fluid to said down pipe and urging a downward flow through said down pipe;

d) means for conveying said hydrocarbon fluid from the evaporator to said down pipe and entraining said hydrocarbon fluid within the downwardly flowing non-miscible fluid;

e) a separation chamber disposed at the lower end of said down pipe for receiving said downwardly flowing hydrocarbon fluid and the non-miscible fluid and segregating said hydrocarbon fluid from the non-miscible fluid;

f) means for withdrawing the non-miscible fluid from the separation chamber; and g) means for conveying hydrocarbon fluid from said separation chamber to the evaporator through the expansion valve.

21. The apparatus as set forth in claim 20 including heat exchange means for drawing heat from the non-miscible fluid.

22. A method for compressing and withdrawing heat from a hydrocarbon fluid within a refrigeration system having an evaporator and an expansion valve, said method comprising the steps of:

a) establishing a downward flow of a fluid non-miscible with the hydrocarbon fluid within a down pipe;

b) conveying the hydrocarbon fluid from the evaporator to the upper end of the down pipe;

c) entraining the hydrocarbon fluid within the downward flow of the non-miscible fluid;

d) separating the hydrocarbon fluid from the non-miscible fluid at the lower end of the down pipe; and e) transmitting the separated hydrocarbon fluid from the lower end of the down pipe through the expansion valve to the evaporator.

23. The method as set forth in claim 22 including the step of drawing and pumping the non-miscible fluid from the lower end of the down pipe to the upper end of the down pipe.

24. The method as set forth in claim 23 including the step of drawing heat from the non-miscible fluid with a heat exchanger.

25. The method as set forth in claim 24 including the step of transferring heat between the hydrocarbon fluid flowing into the expansion valve and the hydrocarbon fluid flowing from the evaporator.

26. The method as set forth in claim 22 including the step of deaerating the mixture of hydrocarbon fluid and non-miscible fluid.

27. Hydraulic refrigeration apparatus comprising in combination:

a) a vertically oriented loop having a lower end and an upper end for compressing a hydrocarbon refrigerant fluid entrained in a carrier fluid non-miscible with the hydrocarbon refrigerant fluid in response to downward flow of the carrier fluid;

b) means for segregating the hydrocarbon refrigerant fluid from the carrier fluid at the lower end of said loop;

c) means for conveying the segregated hydrocarbon refrigerant fluid from the lower end of said loop through an expansion valve to an evaporator;

d) means for conveying the hydrocarbon refrigerant fluid from the evaporator to the upper end of said loop;

e) means for entraining the hydrocarbon refrigerant fluid with the carrier fluid;

f) means for drawing heat from the segregated carrier fluid; and g) means for deaerating said loop.

28. The apparatus as set forth in claim 27 including means for exchanging heat between the hydrocarbon refrigerant fluid flowing into the evaporator with the hydrocarbon refrigerant fluid flowing out of the evaporator.

29. The apparatus as set forth in claim 27 including means for varying the quantity of carrier fluid within said loop in response to varying refrigeration loads.

30. The apparatus as set forth in claim 27 including means for adding hydrocarbon refrigerant fluid during and subsequent to deaeration of said loop.

* * * * *